United States Patent [19]

Leverenz

[11] Patent Number: 4,835,261

[45] Date of Patent: May 30, 1989

[54] NONIONIC AZO COMPOUNDS IN WHICH THE COUPLING COMPONENT IS A 3,4-DIALKOXY ANILINE DERIVATIVE

[75] Inventor: Klaus Leverenz, Leverkusen, Fed. Rep. of Germany

[73] Assignee: Bayer Aktiengesellschaft, Leverkusen, Fed. Rep. of Germany

[21] Appl. No.: 25,256

[22] Filed: Mar. 12, 1987

[30] Foreign Application Priority Data

Mar. 20, 1986 [DE] Fed. Rep. of Germany ....... 3609343

[51] Int. Cl.$^4$ .............. C09B 29/01; C09B 29/039; C09B 29/042; C09B 29/045

[52] U.S. Cl. .................. 534/788; 534/573; 534/597; 534/732; 534/733; 534/752; 534/753; 534/761; 534/787; 534/795; 534/802; 534/847; 534/850; 534/859

[58] Field of Search .............. 534/859, 850, 588, 788, 534/769, 765, 756, 795, 763, 752, 732, 733

[56] References Cited

U.S. PATENT DOCUMENTS

| | | | |
|---|---|---|---|
| 1,810,273 | 6/1931 | Haller | 534/859 X |
| 1,963,133 | 6/1934 | Jordan et al. | 534/859 |
| 2,030,214 | 2/1936 | Knight | 534/859 X |
| 2,069,158 | 1/1937 | Schnitzpahn et al. | 534/859 X |
| 2,196,984 | 4/1940 | Ellis et al. | 534/859 X |
| 2,289,413 | 7/1941 | Ellis et al. | 534/859 X |
| 2,970,029 | 1/1961 | Kracker et al. | 534/859 X |
| 3,102,878 | 9/1963 | Baumann et al. | 534/611 X |
| 3,287,358 | 11/1966 | Catino et al. | 534/689 X |

FOREIGN PATENT DOCUMENTS

| | | | |
|---|---|---|---|
| 879986 | 3/1943 | France | 534/850 |
| 45-1665 | 1/1970 | Japan | 534/859 |
| 95223 | 3/1960 | Netherlands | 534/844 |
| 97423 | 10/1960 | Netherlands | 534/844 |
| 412164 | 9/1932 | United Kingdom | 534/859 |

*Primary Examiner*—Floyd D. Higel
*Attorney, Agent, or Firm*—Sprung Horn Kramer & Woods

[57] ABSTRACT

Azo compounds of the formula I

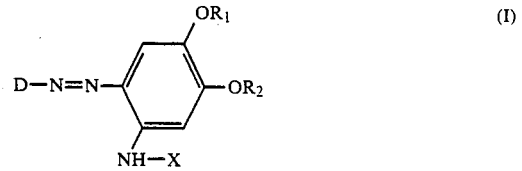

where
 D = diazo component
 $R_1$ and $R_2$ = alkyl or aralkyl
 X = H, hydrocarbon radical or acyl
are useful dyestuffs or dyestuff intermediates.

6 Claims, No Drawings

NONIONIC AZO COMPOUNDS IN WHICH THE COUPLING COMPONENT IS A 3,4-DIALKOXY ANILINE DERIVATIVE

The present invention relates to nonionic azo compounds of the formula

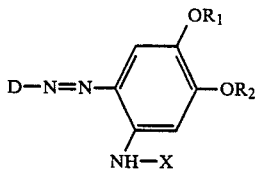
(I)

where

D stands for the radical of a diazo component which has at least one nonionic, electron-attracting substituent, $R_1$ and $R_2$ denote an alkyl or aralkyl radical or—together—an alkylene group and X denotes hydrogen or an alkyl, aralkyl, aryl, hetaryl or acyl radical, which radicals can have further nonionic substituents customary in azo chemistry, except the azo compounds described in German Patent Application No. P 3 516 667.3 and German Patent Specification Nos. 744,215 and 643,058 or, more specifically, except those azo compounds whose benzenediazo component is unsubstituted in the one ortho-position relative to the azo bridge and is substituted in the other ortho-position by halogen, alkoxy or OH.

Suitable diazo components D are not only aromatic but also heteroaromatic radicals, in particular those of the benzene, naphthalene, thiophene, thiazole, thiadiazole, benzothiazole, benzisothiazole and pyrazole series, which carry at least one nonionic, electron-attracting substituent.

Suitable acyl radicals are radicals of the formulae $-COR_1$, $-COOR_1$, $-CONH_2$, $-CONHR_1$, $-CONR_1R_2$, $-COH$ and $-COR_3$, where $R_3$ denotes aryl or hetaryl.

Suitable alkyl radicals $R_1/R_2$ are for example those having 1–6 C atoms, which are optionally substituted by OH or $C_1$–$C_4$-alkoxy.

Suitable aryl radicals $R_1$–$R_3$ and X are phenyl radicals which can be substituted by $CF_3$, halogen, $C_1$–$C_4$-alkyl or $C_1$–$C_4$-alkoxy.

Suitable aralkyl radicals are phenyl-$C_1$–$C_3$-alkyl radicals which can be substituted in the phenyl radical as indicated in the preceding paragraph.

Suitable alkylene groups $R_1+R_2$ are $-(CH_2)_n-$ (n=1–2).

Suitable halogen atoms are F and in particular Br, Cl and I.

Suitable nonionic electron-attracting substituents are $NO_2$, CN, $CF_3$, alkylsulphonyl, (di)alkylaminosulphonyl, phenylazo, $-COR_1$, $-COOR_1$, $-CONH_2$, $-CONHR_1$, $-CONR_1R_2$, COH, $COR_3$ Preferred azo compounds are those of the formula

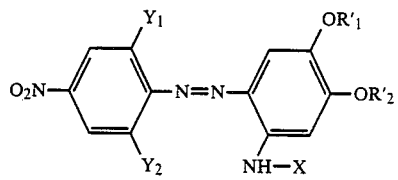
(II)

where
X′ denotes hydrogen or $COR'_1$,
$R'_1$ denotes $C_1$–$C_4$-alkyl,
$R'_2$ denotes $C_1$–$C_4$-alkyl,
$Y_1$ denotes F, Cl, Br, I, $NO_2$, CN or $OR'_1$ and
$Y_2$ denotes $Y_1$ or $CF_3$, $SO_2R'_1$, $CO_2R_1$, $COR'_1$ or $OR_1$ and those of the formula

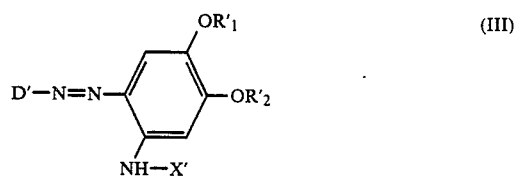
(III)

where
D′ denotes the radical of a heterocyclic diazo component of the abovementioned kind, in particular those of the formulae

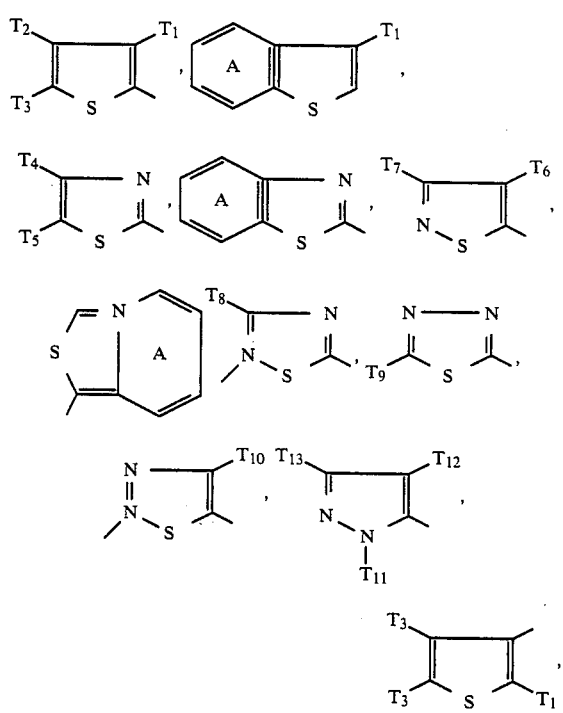

$T_1$=$NO_2$, CN or $COOR_1$
$T_2$=H or $CH_3$
$T_3$=$NO_2$, CN, $COOR_1$, $COR_1$, $COR_3$, $SO_2R_1$, $SO_2R_3$ or phenylazo
$T_2+T_3$=$-CH_2CH_2CH_2CH_2-$ or $-CH_2CH_2CH_2-$
$T_4$=H, $CH_3$ or phenyl
$T_5$=$NO_2$, $COOR_1$, CN or phenylazo
$T_6$=Br, $NO_2$ or CN
$T_7$=H, $R_1$, $R_3$ or $SO_2R_1/R_3$ T$_8$ = Cl, Br, CN, phenyl, CH$_3$ or SR$_1$
T$_9$ = Cl, Br, CF$_3$, SO$_2$R$_1$/R$_3$ or SR$_1$
T$_{10}$ = H, R$_1$, R$_3$, Cl, Br or COOR$_1$
T$_{11}$ = H or R$_1$
T$_{12}$ = NO$_2$, CN, Cl, Br, COOR$_1$
T$_{13}$ = H, CN or R$_1$
where
R$_1$/R$_3$ have the abovementioned meaning, and the rings which are marked with an A and also the phenylazo radical can be substituted by R$_1$, Cl, Br, NO$_2$, CN, COOR$_1$, SCN or SO$_2$R$_1$.

The new azo compounds are obtained in conventional manner by (a) diazotizing amines of the formula

    (IV)

and coupling onto compounds of the formula

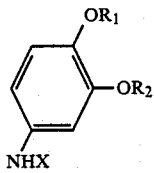    (V)

or (b) oxidative coupling of hydrazines of the formula

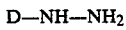    (VI)

onto compounds of the formula (V).

The compounds of the formulae IV–VI are known or are obtainable by known methods.

Those dyestuffs of the formula II where Y$_1$ and/or Y$_2$ stand for CN, SO$_2$R$'_1$ or NO$_2$ can advantageously also be prepared by likewise prior art replacement reactions on appropriate o,(o'-di)-halogenoazo compounds.

The new azo compounds are dyestuffs and intermediates for preparing dyestuffs.

For example, the compounds of the formula I can be converted by reaction with amines into the corresponding p-aminobenzenes, of which some are known useful textile dyestuffs.

If the azo compounds of the formula I are used as dyestuffs, for example, for dyeing and printing polyester fibre materials, this is effected on the one hand by conventional aqueous and non-aqueous methods from a long or short liquor and on the other by applying customary print pastes or, however, by the similarly known transfer printing principle.

In addition, some types are suitable for spin- and mass-colouring polymers.

The λ$_{max}$ values quoted in the examples below were measured in DMF.

EXAMPLE 1

(a) 29.6 g of 2,6-dibromo-4-nitroaniline are added at 35° C. to a mixture of 43 ml of 96% strength sulphuric acid and 17.7 ml of 40% strength nitrosylsulphuric acid. After stirring overnight the diazonium salt solution obtained is added dropwise to a dispersion of 16.8 g of 3,4-dimethoxyaniline in 140 ml of water/7 ml of 80% strength amidosulphonic acid/7 ml of 10% strength surfactant, the temperature being maintained at 0°–10° C. by adding ice. After the coupling has ended, the product is filtered off with suction, washed until neutral and dried. Yield of dibromoazo compound: 40 g.

(b) 46 g of this product are heated to 80° C. in a mixture of 105 ml of DMF and 17 ml of pyridine for about 10 minutes together with 17.8 g of CuCN. After cooling down to room temperature, 105 ml of methanol and 36 g of FeCl$_3$ are added. The mixture is then stirred for a further hour, and the product is then filtered off with suction. It is washed with dilute hydrochloric acid, methanol and water. Drying leaves 21.7 g of the dyestuff of the formula

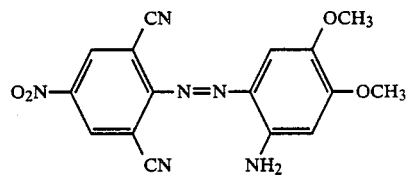

It dyes polyester fibres in a bright bluish green shade, λ$_{max}$: 620 nm.

EXAMPLE 2

The diazonium salt solution of 26.2 g of 2,4-dinitro-6-bromoaniline (prepared by means of 19 ml of 40% strength nitrosylsulphuric acid in 48.3 ml of 96% strength H$_2$SO$_4$) is added dropwise to a dispersion of 16.8 g of 3,4-dimethoxyaniline in 140 ml of water/7 ml of 80% strength amidosulphonic acid/7 ml of 10% strength surfactant solution. By addition of ice the temperature is maintained at 0°–10° C. Filtering off with suction, washing and drying leaves 37.4 g of the bluish violet azo dyestuff of the formula

λ$_{max}$ = 575 nm

EXAMPLE 3

42.6 g of the azo dyestuff of Example 2 are reacted at 60° C. with 9 g of CuCN in 100 ml of DMF/10 ml of pyridine for 15 minutes.

Working up analogously to Example 1b gives 19.5 g of the bluish green azo dyestuff of the formula

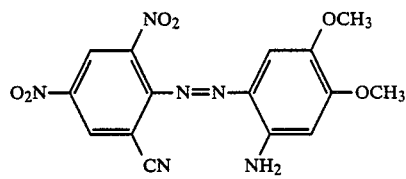

λ$_{max}$ = 604 nm

EXAMPLE 4

The diazonium salt solution of 18.3 g of 2,4-dinitroaniline (prepared analogously to Example 2) is coupled with the aqueous dispersion of 16.8 g of 3,4-dimethoxyaniline analogously to Example 2. Corresponding working up gives 38.2 g of the violet dyestuff of the formula

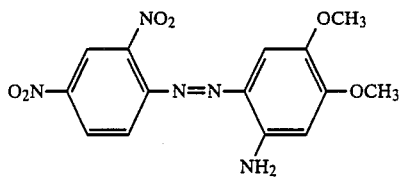

$\lambda_{max} = 563$ nm

EXAMPLE 5

(a) The diazonium salt solution prepared in Example 1a is added to the dispersion of 26.5 g of 3,4-dimethoxy-N-2'-ethylhexylaniline in 60 ml of glacial acetic acid, while a temperature of 0°–3° C. is maintained by adding ice.

(b) The 45 g of dibromoazo compound obtained above as a resin are reacted at 60°–70° C. with 17.9 of CuCN in 100 ml of DMF/10 ml of pyridine for 20 minutes. The working up analogously to Example 1b gives 22.8 g of the bluish green dyestuff of the formula

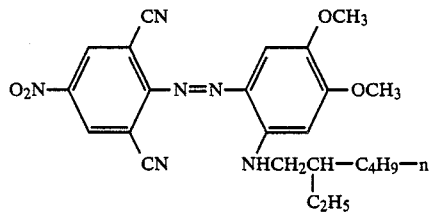

$\lambda_{max} = 623$ nm

EXAMPLE 6

19.5 g of 3-amino-5-nitro-2,1-benzisothiazole is dissolved in 48 ml of 96% strength sulphuric acid and 17 ml of 85% strength o-phosphoric acid by heating, and 18 ml of nitrosylsulphuric acid are added dropwise, with external cooling, at 0°–4° C. This is followed by 3 hours of stirring at the same temperature. The resulting diazonium salt solution is then added dropwise in the course of 15–30 minutes to the dispersion of 19.5 g of N-(3,4-dimethoxyphenyl)-acetamide in 345 ml of water/1 g of 100% strength surfactant/1 g of amidosulphonic acid with simultaneous addition of 380 g of ice. This is followed by a further 4 hours of stirring at 10° C. and then filtering with suction, washing until neutral and drying, affording about 35 g of the green azo dyestuff of the formula

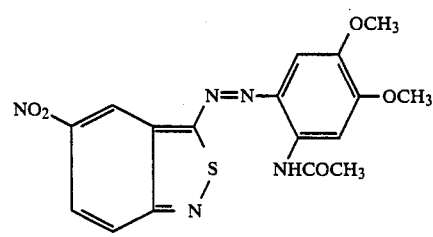

$\lambda_{max} = 564$ nm

The same way is used to prepare the following dyestuffs, the hue describing the shade of the polyester dyeing and the $\lambda_{max}$ value having been measured in DMF:

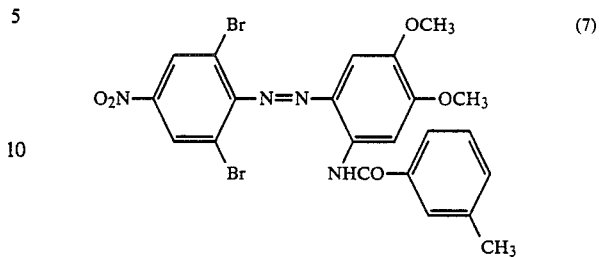

(reddish brown; $\lambda_{max}$: 452 nm)

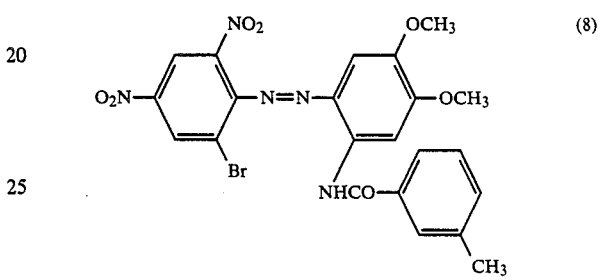

(claret red; $\lambda_{max}$: 500 nm)

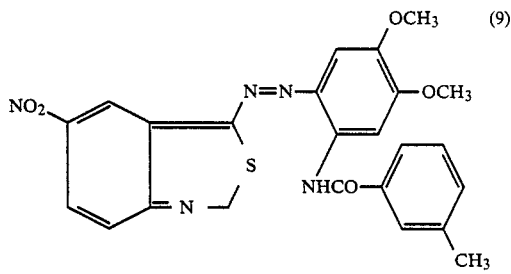

(bluish violet; $\lambda_{max}$: 654 nm)

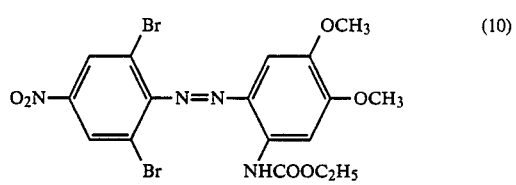

(reddish brown; $\lambda_{max}$: 446 nm)

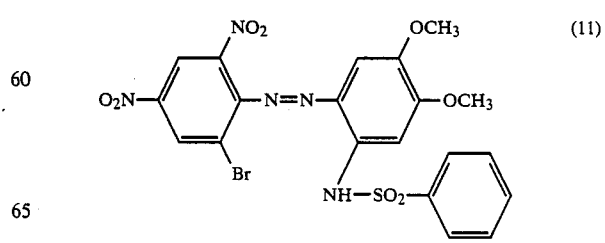

(bluish red; $\lambda_{max} = 683$ nm)

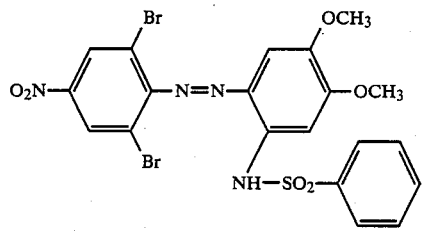
(yellowish brown; $\lambda_{max}$=404 nm)
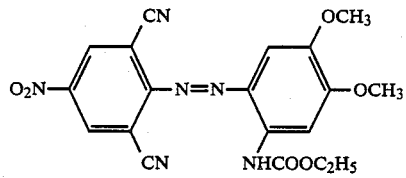
(reddish violet; $\lambda_{max}$: 552 nm)
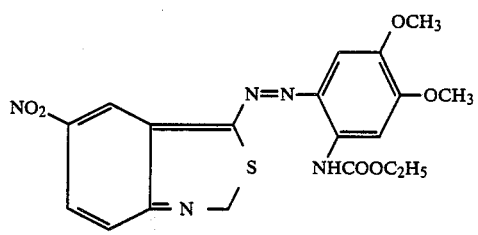
(violet; $\lambda_{max}$: 544 nm)
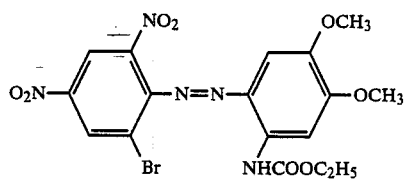
(claret red; $\lambda_{max}$: 504 nm)
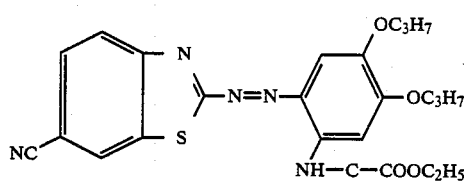
(claret red; $\lambda_{max}$: 500 nm)
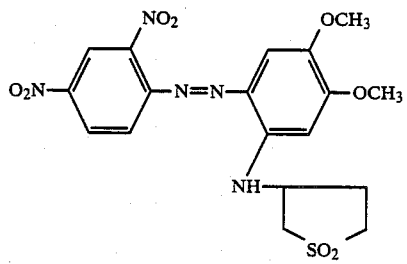
(navy)
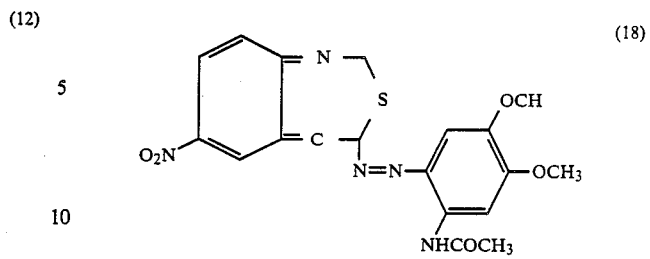
(bluish violet; $\lambda_{max}$: 564 nm)
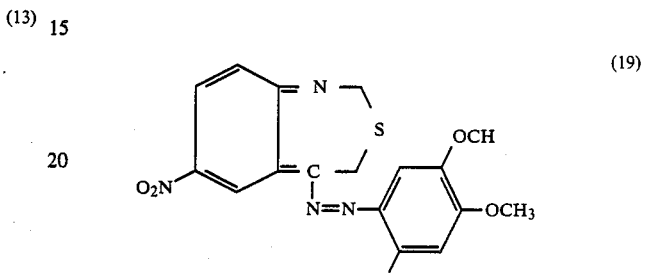
(bluish violet; $\lambda_{max}$: 560 nm)
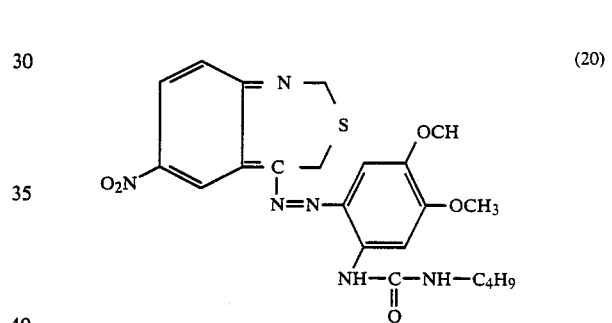
(bluish violet; $\lambda_{max}$: 560 nm)
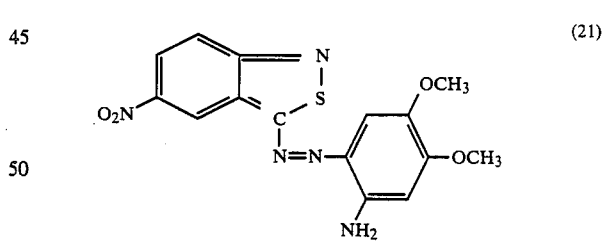
green $\lambda_{max}$=635 nm
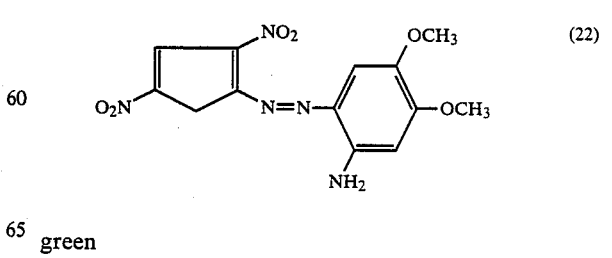
green
I claim:
1. A nonionic azo compound of the formula

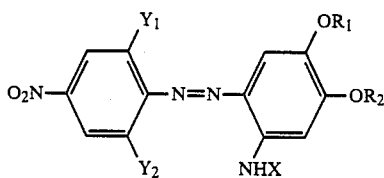

wherein
X stands for —COR₁, COOR₁, —CONH₂, —CONHR₁, —CONR₁R₂, —COH and —COR₃, where R₃ denotes unsubstituted phenyl or phenyl which is substituted by CF₃, halogen, C₁–C₄-alkyl or C₁–C₄-alkoxy, R₁ and R₂ denote alkyl or unsubstituted phenyl-C₁–C₃-alkyl or phenyl-C₁–C₃-alkyl which is substituted in the phenyl by CF₃, halogen, C₁–C₄-alkyl or C₁–C₄-alkoxy or—together—a C₁–C₂-alkylene group and said alkyl having 1–6 C atoms, and is unsubstituted or substituted by OH or C₁–C₄-alkoxy, Y₁ denotes NO₂, CN or OR₁, and Y₂ denotes F, Cl, Br, I, NO₂, CN, CF₃, SO₂R'₁, CO₂R₁, COR₁ or OR₁.

2. An azo compound according to claim 1, wherein Y₂ is Cl.

3. An azo compound according to claim 1 of the formula

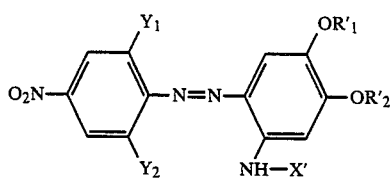

wherein
X' denotes COR'₁,
R'₁ denotes C₁–C₄-alkyl,
R'₂ denotes C₁–C₄-alkyl,
Y₁ denotes NO₂, CN or OR'₁ and
Y₂ denotes F, Cl, Br, I, NO₂, CN, CF₃, SO₂R'₁, CO₂R₁, COR'₁ or OR'₁.

4. An azo compound according to claim 1 of the formula

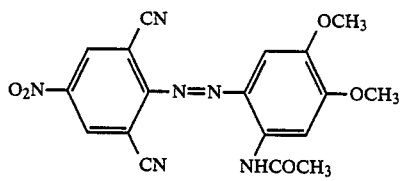

5. A nonionic azo compound of the formula

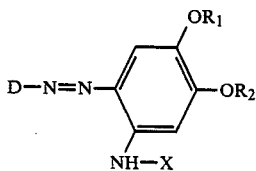

wherein
D stands for the radical of a diazo component selected from the group consisting of naphthalene, thiophene, thiazole, thiadiazole, benzothiazole, benzisothiazole and pyrazole, which is substituted by one or more nonionic, electron-attracting substituent's selected from the group consisting of NO₂, CN, CF₃, alkylsulphonyl, (di)alkylaminosulphonyl, phenylazo, —COR₁, —COOR₁, —CONH₂, —CONHR₁, —CONR₁R₂, COH and COR₃, stands for —COR₁, COOR₁, —CONH₂, —CONHR₁, —CONR₁R₂, —COH and —COR₃, where R₃ denotes unsubstituted phenyl or phenyl which is substituted by CF₃, halogen, C₁–C₄-alkyl or C₁–C₄-alkoxy, and R₁ and R₂ denote alkyl or unsubstituted phenyl-C₁–C₃-alkyl or phenyl-C₁–C₃-alkyl which is substituted in the phenyl by CF₃, halogen, C₁–C₄-alkyl or C₁–C₄-alkoxy or—together—a C₁–C₂-alkylene group and said alkyl having 1–6 C atoms, and is unsubstituted or substituted by OH or C₁–C₄-alkoxy.

6. An azo compound according to claim 5 of the formula

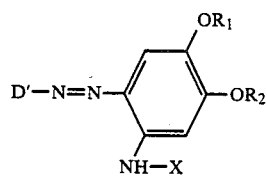

wherein
D' denotes the radical of a heterocyclic diazo component selected from the group consisting of the following formulae

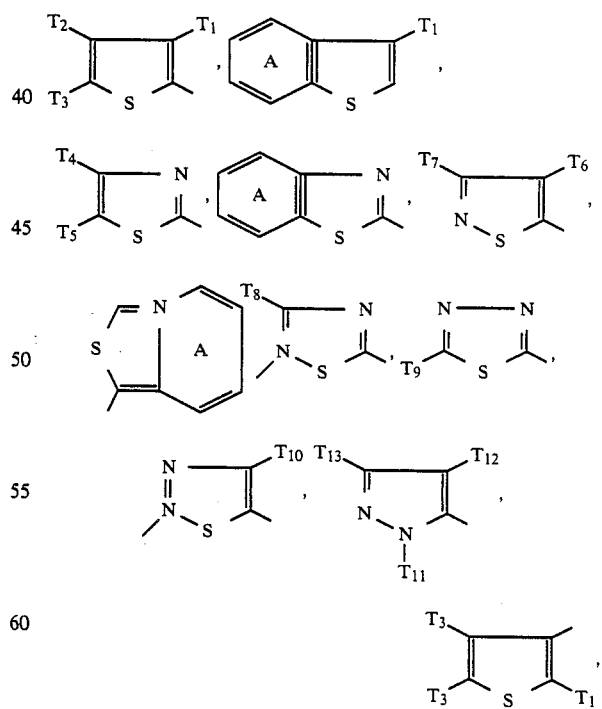

T₁=NO₂, CN or COOR₁
T₂=H or CH₃
T₃=NO₂, CN, COOR₁, COR₁, COR₃, SO₂R₁, SO₂R₃ or phenylazo $T_2+T_3 =$ —CH$_2$CH$_2$CH$_2$CH$_2$— or —CH$_2$CH$_2$CH$_2$—
$T_4 =$ H, CH$_3$ or phenyl
$T_5 =$ NO$_2$, COOR$_1$, CN or phenylazo
$T_6 =$ Br, NO$_2$ or CN
$T_7 =$ H, R$_1$, R$_3$ or SO$_2$R$_1$/R$_3$
$T_8 =$ Cl, Br, CN, phenyl, CH$_3$ or SR$_1$
$T_9 =$ Cl, Br, CF$_3$, SO$_2$R$_1$/R$_3$ or SR$_1$
$T_{10} =$ H, R$_1$, R$_3$, Cl, Br or COOR$_1$
$T_{11} =$ H or R$_1$
$T_{12} =$ NO$_2$, CN, Cl, Br, COOR$_1$
$T_{13} =$ H, CN or R$_1$ wherein the rings which are marked with an A and the phenylazo are unsubstituted or substituted by R$_1$, Cl, Br, NO$_2$, CN, COOR$_1$, SCN or SO$_2$R$_1$.

* * * * *